United States Patent [19]

Bronovets et al.

[11] 3,852,993
[45] Dec. 10, 1974

[54] METHOD OF DETERMINING THE FRICTIONAL AND MECHANICAL PROPERTIES OF MATERIALS AND A DEVICE FOR THE REALIZATION THEREOF

[76] Inventors: Marat Alexandrovich Bronovets, Lefortowsky val, 7/6, korpus 4, kv. 32; Mikhail Nikolaevich Dobychin, Frunzenakaya neberezhnaya, 48, kv. 6; Igor Viktorovich Kragelsky, ul. Ivanovskaya, 26, kv. 2, all of Moscow; Nikolai Matveevich Mikhin, Mikroraion Serebryanka, 6, kv. 34, Pushkino Moskovskoi oblasti, all of U.S.S.R.

[22] Filed: Aug. 1, 1972

[21] Appl. No.: 277,041

[52] U.S. Cl. .............................. 73/12, 73/9, 73/79
[51] Int. Cl. .................... G01n 3/52, G01n 19/02
[58] Field of Search ............ 73/8, 9, 11, 12, 79, 82, 73/146, 10, 13, 78, 150

[56] References Cited
UNITED STATES PATENTS
1,891,613  12/1932  Widney .......................... 73/11 UX

| 2,296,657 | 9/1942  | Wallace ...................... 73/9 |
| 2,587,628 | 3/1952  | King .......................... 73/11 |
| 3,152,468 | 10/1964 | Powell ...................... 73/9 X |
| 3,425,263 | 2/1969  | Elliott et al. ............... 73/12 |
| 3,518,872 | 7/1970  | Tiner et al. ................. 73/9 |
| 3,625,052 | 12/1971 | Jones ........................ 73/79 |

*Primary Examiner*—Charles A. Ruehl
*Attorney, Agent, or Firm*—Waters, Roditi, Schwartz & Nissen

[57] ABSTRACT

The method is based on the collision of a specimen, specifically motor vehicle wheel, with a surface being studied and is intended for determining the coefficients of adherence, sliding friction and rolling friction in dynamic conditions as well as of hysteresis losses, dynamic modulus of elasticity and impact hardness of materials, provided a preset friction at a required speed.

A device for the realization of the proposed method has a means for rotating the specimen in the course of tests about the essentially horizontal axis as well as a system for measuring the parameters of reboundings.

13 Claims, 6 Drawing Figures

METHOD OF DETERMINING THE FRICTIONAL AND MECHANICAL PROPERTIES OF MATERIALS AND A DEVICE FOR THE REALIZATION THEREOF

The invention relates to the methods of determining the coefficients of adherence, sliding friction and rolling friction in dynamic conditions as well as for determining the hysteresis constant, dynamic modulus of elasticity and impact hardness of the materials of a specimen and/or a reference specimen, provided there is preset friction at a required speed.

The invention can be useful for the study of friction and cohesion with the surface of a reference specimen of various articles, wheels, pneumatic tires and bodies of revolution, e.g., balls, discs, wheels, which furtheron are commonly referred to as "specimen."

Used as a reference specimen, there may be another body or article, various materials, substances, rolling surfaces, including road surfaces.

Tests can be carried out in the conditions of a dry boundary and fluid friction.

As it has been pointed out hereinabove, the proposed invention can be helpful for determining the coefficients of adherence, sliding friction and rolling friction of pneumatic tires on rolling surfaces. The known methods and devices intended for measuring the coefficients of sliding friction (adherence) of the tire on road can be classified into the following basic types:

a. a method based on measuring the deceleration of a motor vehicle moving at a preset speed after blocking all of its wheels or measuring its braking distance;

b. a method based on using dynamometric trailers towed by a motor vehicle to measure the tangential force during their braking;

c. a method based on measuring forces induced by a forced slippage of the wheel during its rerolling, use being made of trailer vehicles;

d. a method based on the pendulum principle and consisting in measuring the energy consumed by friction forces;

e. variations of the "running down" method, as applied to the pneumatic tire, specifically, this method underlies a device developed in the Madrid Laboratory of Transport and Soil Mechanics (cf., a report by Il Escario A Lico: "Special device for studying the impact of tires on the coefficients of sliding friction (adherence)," made at the symposium "Tyre and Road," Paris, 20-24 of May, 1959).

The methods as specified in items b and c call for the use of tow-cars and rather long portions of a flat road surface.

The test speeds as specified in items a, b and c are limited to the speeds of motor vehicles proper and to road conditions.

The method as specified in item d is valid for testing laboratory specimens; thus, in the Leroult pendulum, provision is made for a rubber band; in the mobile device for testing slip resistance, which is employed by the British Road Research Laboratory, a friction part is a rectangular rubber-made parallelepiped provided on the mobile portion of the pendulum so that only one of its ribs is in friction with the surface under study.

The device developed by the Madrid Laboratory of Transport and Soil Mechanics to study the impact of tires on the coefficient of sliding friction (adherence) is made up of a pneumatic shaft-mounted wheel with two flywheels set coaxially on the same shaft to both sides of the wheel. The wheel shaft is connected with the drive and secured in a rocking fork that couples it with the fixed frame of the device. Load on the wheel is produced by the weight of said the wheel plus the weight of the flywheels to amount to 101 kg. The device is transported by car to a testing area and remains coupled with it throughout the tests.

When elevated, the wheel is accelerated by an auxiliary motor up to 120 kmph. The speed is measured by a speedometer. After that, the wheel is brought into contact with a surface being tested. As soon as the wheel is lowered to a position when it can touch the surface, its drive gets cut off, the wheel continuing to rotate by inertia. A frictional force that is developed when the wheel is in contact with the surface, slows down the rotation of the wheel until it stops completely. In the device being described herein, the angular deceleration of the wheel is determined by measuring, with the aid of electric resistance pick-ups and related equipment, a torque developing on the wheel axis as a result of variations in the angular speeds of the flywheels.

Another method of recording the deceleration of the wheel implies measuring a distance covered by it per time unit. Used for this purpose are a commutator ring rotating together with the wheel plus a Kelvin Hugher Recorder.

In the second method, the average coefficient of friction is calculated from the polar moment of the inertia of rotation of the wheel and the flywheels, normal load, radius of the wheel, circumferential speed and a distance covered by a point of the wheel's external surface from the starting moment till stopping.

Furthermore, the angular deceleration helps determine the average coefficient of frictional drag for a more limited range of speeds.

The disadvantages of the device being described are as follows:

First, as practice shows, the device is good when initial speeds do not exceed 60 kmph. At higher speeds, tires get overheated and road surface deteriorates quicker than usual, with the tires material sticking on to the surface, which leads to variations in the values of the coefficient of friction, as compared with the initial drag.

Second, the coefficient of sliding friction is measured when there is no rerolling at all, which is conditioned by the superimposing of kinematic coupling on the progressive movement of the wheel.

Third, although the device is intended for testing the wheels of cars and motorcycles, the total load is yet as small as 101 kg, which is not enough even for normal loading of wheels or midget cars. A permissible increase in the load for testing, say, truck wheel tires, calls for an appreciable increase in the aggregate weight per wheel, which cannot but complicate the design of the device and make the testing more difficult. Provision of a load smaller than normal (measured as the total car weight per wheel) would condition variations in the values of the coefficient of friction and impede their determination at normal loads.

Fourth, the angular deceleration is rather difficult to record.

The examination of the above device shows that its potentialities can be expanded by eliminating the disadvantages described hereinabove, for which purpose it is necessary to: first, reduce the duration of the tires contacting with the road surface and, second, enable the wheel to displace, in the course of slipping, along the road surface, i.e., to have a certain rolling speed. These two factors, when combined, would preclude an excessive wear of the surface and an intensive sticking of the tires material onto it, as well as would help avoid tires overheating. All this would exempt the process of friction from abnormal phenomena and create conditions for obtaining more accurate data.

Known in the art is a method of determining the coefficient of friction at a high-speed slipping, which was developed by F. P. Bowden and Persson (1961) (cf., F. P. Bowden and D. Tabor. The Friction and Lubrication of Solids. Part II. Oxford, At the Clarendon Press, 1964) and called an impact method. It was used up to slipping speeds of around 800 mpsec. The upper speed limit presents interest if applied to the friction of the guiding band of the projectile in the gun barrel or of the guides of missiles.

The method of F. P. Bowden and P. A. Persson provides for a diagonal strike of a ball rotating about its vertical axis against the plate. Used for ball acceleration is a method of the suspension and rotation of rotors, which has been developed by J. W. Beams and his assistants for ultra centrifuges (1947). The method consists of the following: a steel ball gets suspended by the magnetic field of a solenoid. The vertical stability of the ball is provided by the photoelectric system of return. The thus suspended ball is accelerated by the rotating magnetic field of a permanent frequency (22.5 kHz) in a rarified atmosphere ($10^{-4}$mm Hg). The forces of resistance to the ball rotation are so small that the ball gets permanent acceleration up to linear speeds limited by the strength of the ball material. According to J. W. Beam, the hardened balls taken from antifriction bearings can stand a linear speed of some 1000 mpsec. The speed of rotation is measured by means of a photographic multiplier which picks up light signals reflected from the burnished ball producing a dark strip. The frequency of these signals being recorded with the aid of an electronic device. The J. W. Beam method underlies the construction of the device developed by F. P. Bowden and P. A. Persson.

After attaining the preset angular speed about the vertical axis, by disconnecting the current in the solenoid, the ball is enabled the possibility of a free fall (normally, from a height of 5 cm) onto the standard specimen inclined at a 30° angle to the vertical in order to measure the effect of the friction forces on the ball rebounding during collision, as, at a direct impact with the ball rotating about the normal, the ball will rebound also along the vertical. A friction force develops during the mutual collision of the ball and the standard specimen, which is effective at a certain distance from the ball axis of rotation, the distance depending upon the ball diameter and the angle of inclination of the reference specimen. Under the action of the friction force, the plane of the ball rebounding gets declined, coinciding, during the fall of the non-rotating ball, with the vertical plane passing through the normal to the surface of the reference specimen at the point of collision. During tests, the angle of declination of the ball rebounding plane is measured with the help of a cylinder provided concentrically to the axis of the ball initial acceleration, the ball strikes against this cylinder when rebounding. The measured angle of declination of the rebounding plane and the angle of inclination of the reference specimen are used for calculating the coefficient of friction.

Known in the art is an apparatus for studying the collision of two bodies with regard to friction, which was designed by L-Stoimenov et al. (cf., "Metod za opredelyane na koeffitsienta na triene pri dopirene na tsylindrichni poverkhnosti po tyakhnata obrazuvashchaa" by L-Lilov, Iv. Ivanov and L. Stoimenov and "Stend za izsledovane na ravninnogo dvishenie na telata," Trudove na V. A. "G. S. Rakhovski," technical series, vol. 2, 1968, pp 27–33, 79–84).

The apparatus permits to the determining of the coefficients of impact friction and provides for the use, as collidable bodies, disks 50 to 100 mm in diameter or for studying friction when a disk strikes against a fixed obstacle. The apparatus is operated as follows. The disk is set on the fixed axle of a carriage by means of a ball bearing. From an external drive, the disk is accelerated about the axle perpendicular to the carriage. The carriage imparts motion thereafter along an inclined plane gradually changing into a horizontal plane. During its movement on the inclined plane, the carriage, together with the disk rotating thereon, is gathering translational velocity and, upon reaching the horizontal plane, collides with the vertical surface of the fixed obstacle or with some other disk mounted similar to the former, study being made of the vertical obstacle.

In the above apparatus, polished glass was preferred as a material of the horizontal plane. This was done for two reasons: first, to reduce the friction of the carriage's sliding along the surface (to this end, the latter is coated with a thin layer of oil) and, second, to help measure the collision parameters indispensable for determining the coefficient of impact friction. The measuring of the collision parameters is done in the following way.

A black screen with a white coordinates grid is provided under the transluscent horizontal plane. Tests are carried out in the dark room, with successive positions of the collided bodies being recorded by a photographic camera mounted above the horizontal plane with pulse illumination at equal time intervals. The measuring of linear and angular speeds is done by the relative position of the collidable bodies against the co-ordinates grid.

The L. Stoimenov's apparatus suffers from a disadvantage consisting in that the collision of the bodies being studied occurs when there is a sliding friction of theirs against the horizontal surface, which brings about their own errors in measuring the collision parameters. From this point of view, the attaining of the appropriate normal collision velocities owing to the free fall of one of the bodies, as provided for in the F. P. Bowden and P. A. Persson device, is more perspective. The known devices for determining the coefficient of friction make use of but a single-time collision of two bodies and are intended for the laboratory tests of materials, using such bodies of rotation as balls and disks, the F. P. Bowden and P. A. Persson device providing for balls and the L-Stoimenov apparatus for disks exclusively.

In the known devices, the initial angular speed of a specimen is developed during collision through its rotation about the vertical axis. Multiple collisions or a single impact during the specimen's rotation about the horizontal axis is impossible. More, none of the known devices utilizing collision can be used for assessing the frictional or mechanical characteristics, provided there is a preset friction at a required speed, in various conditions, for instance, for assessing the coefficients of adherence, sliding, and rolling of wheels in conditions close to operational.

When employing the known devices, the coefficient of sliding friction is determined at some rolling speed always inherent in the friction during collision. This rolling speed is not an independent parameter of the tests, but depends on such parameters as the normal and tangential speeds of an impact, duration of a collision, coefficient of friction, mass of the collided bodies, etc. Some variation in the rolling speed in the known devices can be obtained by varying the collision parameters, but this rolling speed varies only within narrow limits.

Yet, in some instances, it is necessary to determine the coefficients of adherence and sliding friction at a preset rolling speed. Cited as an example may be an assessment of adherence of wheels during the slipping of a motor vehicle moving at a certain onward speed, with the relative sliding speed being invariable, the rolling speed of the wheel largely conditions the coefficient of adherence on ice and snow-clad surfaces, as it depends on the amount of heat released as a result of friction and on the intensity of melting of the surface being studied.

The object of the present invention is to eliminate the abovementioned disadvantages.

It is an object of the present invention to bring the test conditions closer to the operational and to expand the range of parameters of the tests. Another object of the invention is to provide a device for the realization of the proposed method.

The primary object of the invention is to determine, at a preset rolling speed, the coefficients of adherence, sliding and rolling friction, as well as hysteresis constant, impact hardness and the dynamic modulus of elasticity of the materials of the specimen and/or the reference specimen, provided there is a preset friction at a required speed.

These objects are achieved by producing an impact of the specimen against the surface of the reference specimen at a preset tangential speed of their relative displacement, measuring the parameters of their collision, which are essential for determining the frictional and mechanical properties of the materials. As this takes place, according to the invention, the specimen or the reference specimen is enabled the possibility of a number of successive rebounds and the parameters of collisions during rebounding are measured so as to determine, depending on their rolling speeds, the coefficients of adherence, sliding friction and rolling friction.

It is preferable that the preset tangential speed of a relative displacement of the specimen and the reference specimen be developed by rotating the specimen about the essentially horizontal axis.

It is also feasible to measure the parameters of one collision.

It is also expedient that the measuring of the collision parameters be made according to the parameters of the trajectory of rebounding of the specimen or the reference specimen. It is preferable that the distance between the successive rebounds and the maximum heights of the same rebounds be used as the parameters of a rebounding trajectory.

It is also preferable that the distance between the successive collisions and the time of flight of the specimen and/or the reference specimen in between these collisions be regarded as the parameters of rebounding.

It is highly expedient that the coefficients of adherence, sliding friction during the rebounding of the specimen or the reference specimen for any of the row of collisions be defined, at a preset rolling speed, as the relation of the tangential and normal pulses.

For the initial impact, during the free fall of the rotating specimen on the horizontal surface, by a formula $$f = \tfrac{1}{4}\, l_1/h_1 + \sqrt{h_1 \cdot h_0},$$

where $l_1$ is the length of rebounding after the initial impact;

$h_1$ is the maximum height of rebounding after the initial impact;

$h_0$ is the height of fall; for each i-impact against the horizontal plane, by $$f = \frac{1}{4} \left| \frac{l_i \cdot \sqrt{h_{i-1}} - l_{i-1} \cdot \sqrt{h_i}}{h_i \cdot \sqrt{h_{i-1}} + h_{i-1} \cdot \sqrt{h_i}} \right|,$$

where $l_i$ is the length of rebounding after the i-impact;

$h_i$ is the maximum height of the rebound after the i-impact;

$l_{i-1}$ is the length of rebounding after an impact preceding the i-impact;

$h_{i-1}$ is the maximum height of rebounding after the impact preceding the i-impact.

The coefficient of rolling friction at a predetermined rolling speed is determined by multiplying the above tangential-to-normal impulse ratios by the effective arm of frictional forces about the instantaneous center of rotation of the test specimen.

It is desirable that the determination of the hysteresis constant during a preset friction at a required speed be made according to the parameters of reboundings as a result of an elastic impact.

It is also desirable that, for the determination of the hysteresis constant in the course of a preset friction at a required speed, use should be made of the maximum heights of reboundings.

It is expedient that the ball be used as a specimen.

It is also expedient that the wheel be used as specimen as well.

It is highly preferable that, in the course of a preset friction at a required speed, the dynamic modulus of materials elasticity be determined with respect to the area of the ball indentation and the maximum height of a subsequent rebound, the ball deformation being elastic.

It is preferable that, in the course of a preset friction at a required speed, the impact hardness of the material of the reference specimen be determined with respect to the amount of energy spent on the plastic deformation of the reference specimen, the ball deformation being elastic.

It is highly preferable that in the device for the realization of the proposed method, which comprises an arrangement for securing the specimen and making possible its collision with the surface of the reference specimen and subsequent reboundings of the specimen and/or reference specimen, a mechanism for developing a required tangential speed of their relative displacement in the moment of collision, and a system for measuring the parameters of reboundings. There should be, according to the invention, an accessory for rotating the specimen, in the course of the tests, about the essentially horizontal axis plus a system for measuring the parameters of one or several rebounds.

The main advantage of the proposed invention is the possibility of studying the frictional and mechanical properties of sliding with relative simplicity of its embodiment.

The proposed method will help carry out tests at practically unlimited sliding speeds. Thus, for example, when testing pneumatic tires the attainable sliding speed is conditioned by their strength during the rotation about their axis and markedly exceeds practical speeds in operational conditions and, more so, speeds developed in other tests. For example, car wheels can be tested at speeds of up to 300 kmph and higher.

Another example of tests with the use of the proposed invention is the determination of regularities underlying a preliminary displacement as a result of the rolling of drive and braking wheels due to oscillations of non-cushioned masses.

Provision of the impact for creating a normal tire pressure on the rolling surface does not call for the use of additional masses, as is the case with the above-considered device designed in the Madrid Laboratory of Transport and Soil Mechanics. A sufficient specific pressure is developed already at small heights of the free fall owing to the short-term period of collision. Thus, the imprint area for the wheels of the FIAT-124 car, when loaded normally, is provided by the free fall of the hubbed wheel from a height of some 300 mm. For some types of wheels, in order to limit the fall, provision can be made for extra wheels. If so, they should be arranged as flywheels designed to ensure the high relation of the moment of inerted to the mass of load.

Provision of an unimpeded rebound of the wheel after collision makes it possible to take advantage of the parameters of the rebounding trajectory for measuring the parameters of collision, which is much easier than measuring the angular lag as is the case with the above device. Furthermore, the accuracy of determining the coefficient of friction is also higher because there is no overlapping of errors of the secondary measuring instruments on the value to be measured. An error typical of the measurements is due to air resistance alone. This error is not greater than 1 percent and can be brought to nothing by corrections.

If the tests are carried out in vacuum, there is no room for errors due to air resistance.

Parallel with the determination of the frictional properties of materials according to the parameters of collisions and the size of imprints on the specimen and/or the reference specimen, it is possible to establish a number of mechanical properties of materials or substances, specifically the dynamic modulus of elasticity, the coefficient of hysteresis losses and impact hardness.

For instance, the collision of the pneumatic wheel with an undistortionable surface may help determine the hysteresis constant by tracing variations in the maximum height of the wheel rebounds. Such tests facilitate the comparative assessment of the hysteresis losses, using it for an indirect assessment of tire heating in the course of rerolling and for predicting the life of the tire. Further, by making use of the known values of the hysteresis constant of a specific wheel, it is possible to determine the carrying capacity of deformable soils or substances as well as their elasticity by following variations in the maximum height of the wheel rebounds.

Follows the description of an exemplary embodiment of the invention, reference being made to the appended drawings, wherein.

Figure 1:
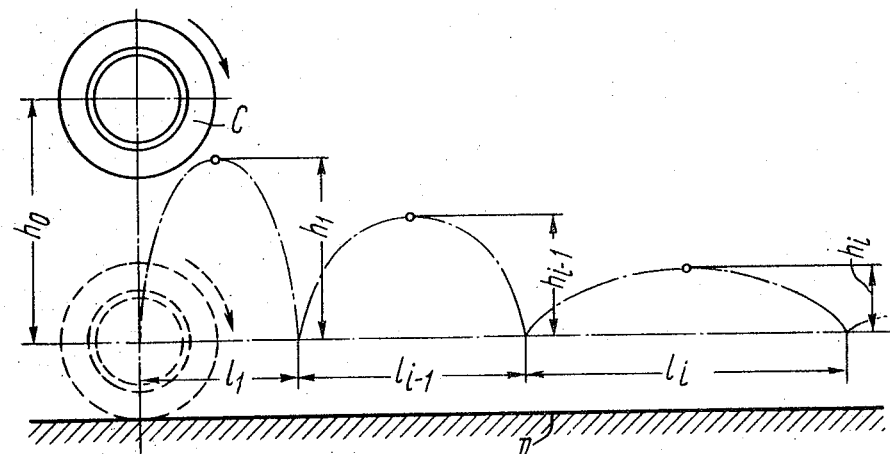
FIG. 1 shows the diagram of the proposed invention (for the case of the free fall of a rotating specimen on the horizontal surface), where C is for specimen and D stands for reference specimen.

According to the proposed invention, the tangential speed of the relative displacement of the specimen and reference specimen is developed during collision by rotating the specimen and/or the reference specimen and through their progressive movement. In specific cases, either angular speed or the relative speed of the progressive movement may be equal to zero. A simple and opportune instance of collision is, according to the invention, an impact of the freely falling specimen rotating about the horizontal axis against the flat surface of the reference specimen, e.g., the unimpeded fall of the car wheel having a preset angular speed on the horizontal portion of the road (FIG. 1). During collision, the specimen is exposed to normal and tangential pulses at a time and it rebounds in a vertical plane at a certain angle to the horizon. After that, the specimen, had it accumulated enough energy and if not impeded, is making a number of successive collisions.

With every subsequent collision up to the moment when pure rolling begins, the speed of movement of the instantaneous center of the specimen's rotation is increasing or dropping unidirectionally, depending upon the relation of the linear and angular speeds of the specimen at the moment of collision, while its angular speed varies so that the relative speed of displacement of the specimen and the reference specimen in the contact zone tends to decrease. Thus, as the number of collisions increases, the process of interaction passes over from sliding at the rolling speed increasing from impact to impact to the preliminary displacement under the same conditions and furtheron to rolling at the dying speed. Upon selecting the corresponding tangential speed of the relative displacement and the height of the specimens dropping at the initial impact, it is possible to obtain the parameters of collision at any of the subsequent impacts.

The recording of the parameters of collisions is done, for example, by measuring the parameters of the rebounding trajectory, specifically, the distance "$l$" between the subsequent collisions and the maximum heights "$h$" of the same rebounds.

For the initial impact, the relation of the tangential and normal impulses can be found from a formula $$f = \frac{1}{4} l_1/h_1 + \sqrt{h_1 h_0},$$

where $l_1$ is the length of rebounding after the initial impact;

$h_1$ is the maximum height of rebounding after the initial impact;

$h_o$ is the height of fall.

At each subsequent i-impact, the relation of the tangential and normal impulses is given by the modulus and is equal to $$f = \frac{1}{4} \left| \frac{l_i \cdot \sqrt{h_{i-1}} - l_{i-1} \cdot \sqrt{h_i}}{h_i \cdot \sqrt{h_{i-1}} + h_{i-1} \cdot \sqrt{h_i}} \right|,$$

where $l_i$ is the length of rebounding after the i-impact;

$h_i$ is the maximum height of rebounding after the i-impact;

$l_{i-1}$ is the length of rebounding after the impact preceding the i-impact;

$h_{i-1}$ is the maximum height of rebounding after the impact preceding the i-impact.

The latter are convenient to be found by recording the rebounding trajectory. When testing the wheels this can be done by providing a recorder, e.g., a hydraulic device ejecting a liquid spray along the axis of rotation, which records the fall trajectory on the coordinates sheet provided in the direction of the wheel rebounding plane. Used as a recorder, in addition to the hydraulic device, there also may be pneumatic, mechanical, optical, electric, and other facilities either arranged on the wheel and coupled with it or located elsewhere. The recorded fall trajectory helps make use of, apart from length and height, other parameters of the rebounding trajectory for determining the coefficient of adherence.

The finding of the maximum height of reboundings is necessary for calculating the time of the specimen's fall in between the collisions and the normal constituent of the rebounding speed. Whenever, for instance, the time intervals between the successive collisions are measured, length alone can be measured out of all the parameters of the rebounding trajectory.

The type of contact interaction can be determined, besides other technique, by a relative correlation of numerical values of the coefficients being measured in accordance with the theory of impact friction.

Another example of application of the proposed method can be cited. It is intended for testing wheels and consists in the following. A wheel is dropped from a transport facility moving along the surface being studied. The wheel is making a number of successive collisions whose parameters help judge the frictional and mechanical characteristics of the collided bodies.

The advantages offered by the proposed method of determining the frictional and mechanical characteristics include, among others, the shortness of the contacting of the bodies being studied, which reduces errors due to their different temperatures, and the absence of limitations whatsoever within a probable range of temperature of the specimen and/or the reference specimen.

To determine the impact hardness and dynamic modulus of elasticity in the course of a preset friction at a required speed, it is necessary to use a ball as specimen.

The impact hardness is defined, in case of the elastic deformation of the ball, according to the amount of energy spent on the plastic deformation of the specimen, as the relation of the work produced by a normal impression of the ball to the volume of a restored imprint on the reference specimen.

To determine the dynamic modulus of elasticity, it is necessary to take advantage of the phase of the ball rebounding from the reference specimen.

From Horstner's law, the elastic portion of the displacement of the imprint obeys the laws of elasticity in case of plastic deformation as well. The possibility of calculating elastic restoration with the help of H. Hertz' formulas in case of the ball indentation accompanied by plastic deformation has been proved by A. N. Dinnik, N. N. Davidenkov, D. Tabor, et al. Therefore, without considering the case of the elastic collision of the ball and the reference specimen, let us see how it is possible to determine the dynamic modulus of normal elasticity in the course of friction taking advantage of the elastic-plastic interaction, if the ball deformation is but elastic.

The determination of the modulus of elasticity through the proposed method is especially important for polymers, rubber, compound and other materials in which the elastic properties largely depend on the duration of load appplication or whose composition of various components calls for the determination of the above properties.

Whenever the materials with coating, films, or boundary layers are used, the collective dynamic properties should be determined.

D. Tabor established (cf., The Hardness of Metals, by D. Tabor, Oxford, Clarendon Press, 1951) that the elastic energy stored in the surfaces as a result of collision in terms of "mgh" is equal to $mgh_i = (3/10) (p_{max}^2/r_o) (1 - M_1^2/E_1 + 1 - M_2^2/E_2)$, where $m$ is the ball mass;

$g$ is the acceleration of the free fall;

$p_{max}$ is the maximum force of the impact at the end of the ball indentation;

$r_o$ is the radius of the restored imprint;

$E_1$ and $E_2$ are the moduli of normal elasticity, whereas $M_1$ and $M_2$ are Poisson's ratios of the material of the reference specimen and the ball.

Taking $P_{max}$ as equal to $2_o^2 H_1$, the previous equation by D. Tabor can be expressed as $1 - M_1^2/E_1 + 1 - M_2^2/E_2 = (10/3) (mgh_i/\pi^2 r_o^3 H_1^2)$, where $H_i$ is the impact hardness.

In case the reference specimen and the ball are made of analogous materials, $1 - M_2^2/E_2 = (5/3) mgh_i/\pi^2 r_o^3 H_1^2$.

After finding $1 - M_2^2/E_2$ for the ball material this way, it is possible to determine a similar value for the material of the specimen $1 - M_1^2/E_1 = (10/3) mgh_i/90^2 r_o^3 H_1^2 - 1 - M_2^2/E_2 = L$ Poisson's ratio, as a relative value, varies little depending upon the speed of deformation. Besides, it is always less than ½ and used to the second power. This circumstance is sufficient ground for utilizing values M, known from the static tests when determining the dynamic modulus of elasticity. From the last expression, it is now possible to find the dynamic modulus of normal elasticity of the specimen material if there is friction $$E_1 = 1 - M_1^2/L.$$

The validity of utilizing the above formulas based on the shape of an imprint fashioned as a spherical segment for calculating the dynamic modulus of elasticity, if there is friction, is limited to the difference in the imprint diameters when measurements are taken along and across the direction of the progressive displacement of the ball. This difference possibly varies depending on the relative speed of the progressive movement of the specimen and reference specimen.

When carrying out tests in the sphere of elastic-plastic interaction with the use of the pulse tribometer described hereinbelow, the condition of the permissible difference of the diameters is observed at the initial impact in all cases.

The proposed method of determining the frictional and mechanical properties of materials can be realized by devices of various designs.

Figure 2:
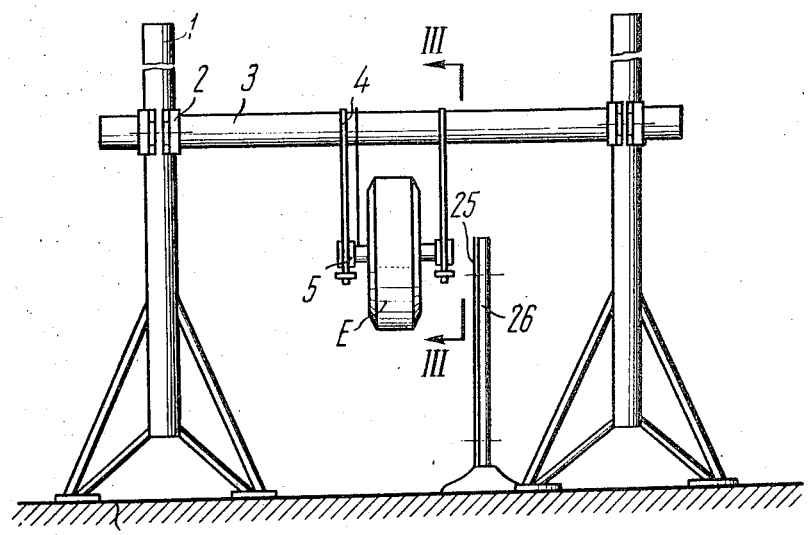
FIGS. 2 and 3 show the device for studying the interaction of wheels with the rolling surface (E — wheel, K — rolling surface)
Figure 3:
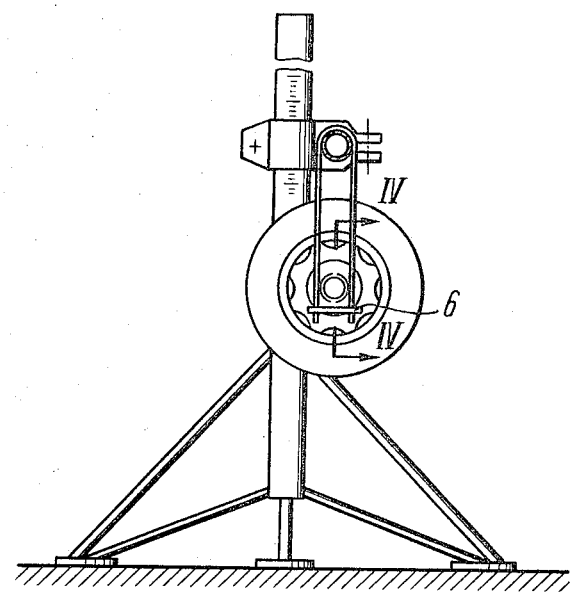
Figure 4:
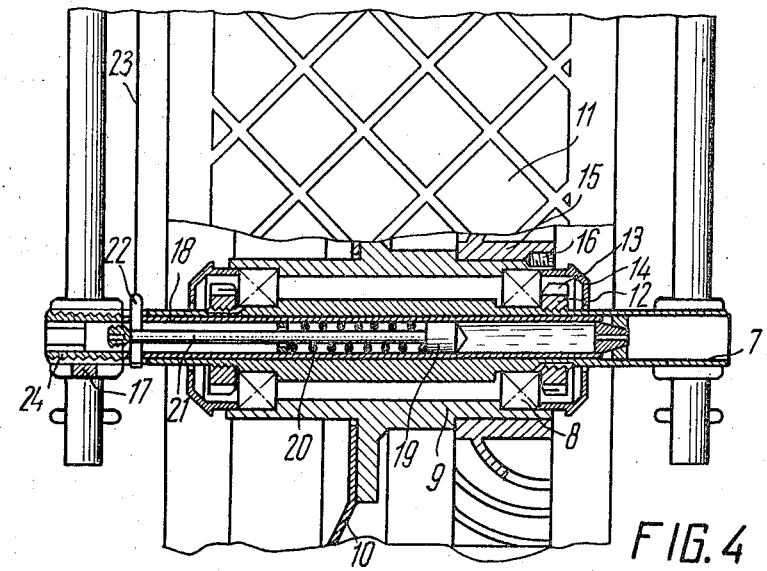
FIG. 4 shows the construction of a wheel being tested.

FIGS. 2, 3, and 4 show one of the simplest devices for studying the interaction of the wheels with the rolling surface.

The device has two props 1 (FIG. 2) attached to which with the aid of brackets 2, are a crossbar 3 and a suspension made up of spring rods 4 with the holders 5 of the wheel axle provided on the rods. The holders are fashioned as parts of the bushes cut into halves. To fasten the wheel axle, they are brought together by clamps 6 as shown in FIG. 3 and in such position form nearly closed bushes whose inner diameter equals the diameter of the wheel axle at places where the latter is secured by the clamps. Once the clamps are in place, the rods become parallel to each other up to the place where the holders are secured, while below the holders the rods converge at an angle of some 6°, which facilitates the mounting of the clamps. Once the clamps are removed, the rods tend to part by an angle sufficient for the wheel axle to pass between them. The construction of the brackets 2, permits to displace the crossbar 3, along the props 3, having a scale to vary the height of the wheel drop, as required, and the position of the wheel axle with regard to the surface being studied.

It is expedient that the wheel axle be parallel to the surface of a test area, the area being horizontal.

By varying the height of the wheel drop, it is possible to control the normal reaction when the tire collides with the surface and obtain, specifically, the area of the tire contacting, which corresponds to the real conditions of its operation.

Provided on the axle 7 (FIG. 4) of the wheel, with the aid of two antifriction bearings 8, is a hub 9, with a disk 10 secured on it and a tire 11 being tested. The tightening of the bearings is effected by nuts 12, with lock washers 13 used to prevent their unscrewing. Externally, the bearings are closed with cups 14. Fastened on the hub by means of screws 16 is a blade wheel 15 designed to accelerate the tire up to a required angular speed with the aid of a jet of compressed air fed by compressor. To this end it is possible to utilize the compressor mounted on the car engine and coupled with an auxiliary receiver. The capacity of the latter depends on the size of the wheel being tested and a required tangential speed of collision. The acceleration of the wheel can be also carried out by the friction method with electric motor used as a drive. The r.p.m. are measured by a tachometer pressed against the tread or side wall of the tyre at a certain radius.

Wheels intended for tests are subject to static or dynamic balancing.

To avoid slippage and displacement in the suspension of the wheel axle, a pin 17 is provided on this axle so as to fit into special recesses arranged in the holders.

Housed inside the axle is a device for recording the trajectory of the wheel rebounding. The device is made up of a cylinder 18 one of whose butts has a calibrated small-diameter hole provided along the axle, a piston 19, a spring 20, a rod 21, a stop 22, and a connecting rod 23 secured on the crossbar 3.

Prior to mounting the trajectory recorder in the wheel, by pulling out the piston from the cylinder 18 it is necessary to fill the space between the piston and the cylinder with a coloured liquid through the hole in the butt. The spring 20 is compressed, and in this position the piston is locked by the stop 22 passing through the rod 21. The cylinder charged with liquid is inserted into the wheel axle and pressed by nut 24.

The strain of spring 20 is selected such as to produce, inside the cylinder, an excessive pressure of liquid, forcing the latter to escape in the form of a powerful jet. The capacity of the cylinder must be sufficient for recording the required length of the wheel rebounding. The experience of operation of the device being described herein shows the diameter of the hole being 0.2 −0.3 mm, the capacity of the cylinder must be around 30 ml.

After attaining the required angular speed of the wheel during its acceleration, the connecting rods are somewhat brought in together pairs by hand pressing. This results in loosening the clamps and their releasing of the rods for opening. Under the action of the weight of the wheel and the elastic forces of the connecting rods, the holders 5 draw apart and the wheel, with the axle, falls on the road surface.

When the wheel falls the connecting rod 23 pulls out the stop 22, and the piston 19 makes a travel under the action of the spring 20 and forces out the liquid through the butt hole. The jet of the liquid ejected in the direction of the axle of the rotating wheel makes a record (FIG. 2) of the trajectory of the wheel fall and rebounds on coordinate sheets 25 secured on stands 26. The presence of a gyroscopic moment because of the rotation of the wheel precludes its inclination during falls and rebounds.

The device described hereinabove can be used for testing not only pneumatic wheels interacting with the road surface. It is also intended for studying the frictional interaction of non-deformable wheels with surfaces of low carrying capacity, such as swampy and sandy soils, snow-clad surfaces, and so on. Those wheels which are not deformed elastically and fail to store potential energy as would impart a rebounding speed to the corresponding vertical constituent should be equipped with built-in devices ensuring their rebounding.

Rebounding makes the testing easier. Still, the assessment of the frictional properties of the surface and the wheel is also possible at a moment when the vertical constituent of the rebounding speed of the wheel moving on the surface is equal to zero. The coefficients of friction and adherence are determined from the value of the acceleration of translation of the wheel.

For testing small-size pieces of materials, a table apparatus called pulse tribometer can be used. Employed as specimens are such bodies of rotation as balls and disks. Besides, the instrument can test such articles similar in shape to bodies of rotation as, say, models of wheels.

The further description of the apparatus is given with reference to the tests using balls. Employment of other types of specimens is analogous.

Figure 5:
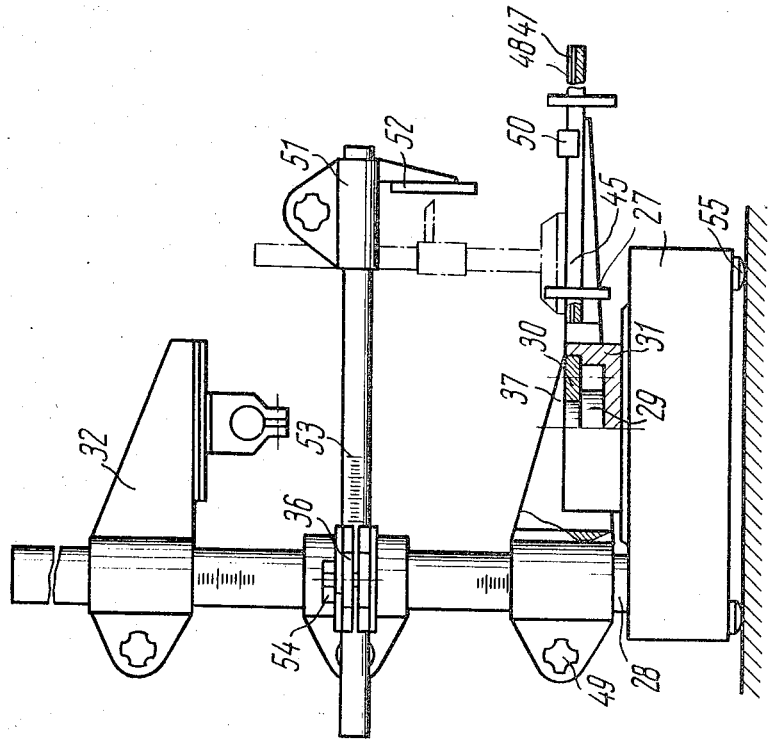
FIGS. 5 and 6 show a pulse tribometer (ball N used as specimen).
Figure 6:
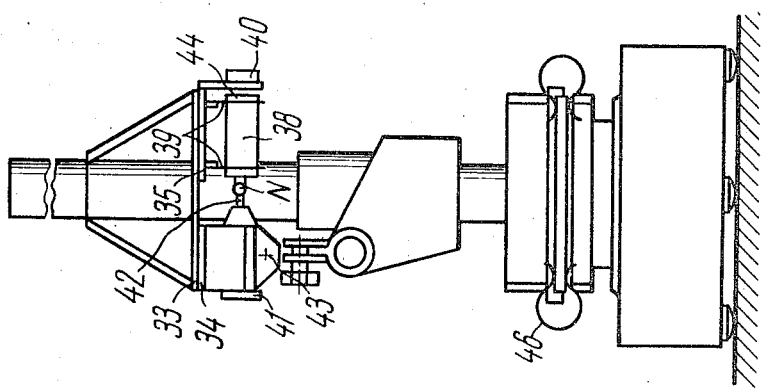

FIGS. 5 and 6 show the pulse tribometer consisting of the following basic units: a body, a mechanism for accelerating and dropping the ball N, and devices for measuring the length and the maximum height of the ball rebounding.

The body of the apparatus is fashioned as a massive foundation plate 27 bearing a column 28 intended for mounting the rest of the units. Fastened on the upper surface of the foundation plate is a reference specimen. Its fastening is possible with the aid of clamps.

When using a standard reference specimen 29 (FIG. 5) for tests, it is secured by three clamps 30 arranged at 130° in the holder 31 of the reference specimen. The provision of this holder facilitating the testing as it possesses sufficient mass and therefore is not secured on the foundation plate 27. This permits the holder to move after each impact of the ball so as to ensure a sufficient interval between the imprints without loosening the reference specimen as is the case when it is secured directly on the plate of the apparatus. Besides, the holder is intended for tests in the sphere of high and low temperatures and in gas media. For providing a closed volume, use is made of a lid (not shown in the drawing). When heating or cooling the reference specimen, the holder is set on a heat-resisting base. At the moment of the ball impact, the lid fitted with heating elements gets removed for an instant. In case of low-temperature tests, the space of the holder 31 of the reference specimen is filled with a cooling liquid, e.g., nitrogen, whose temperature is brought to the required, and the tests are carried out similar to those at high temperatures.

The temperature is measured with the aid of a thermocouple fastened on the reference specimen 29 by means of one of the clamps 30. In case of necessity of heating the reference specimen 29 in a corresponding gas medium, gas is supplied to a heater through a connecting pipe in the bottom of the holder 31 under small excessive pressure.

Used as standard ones are cylinder-shaped reference specimen, 58 mm in diameter and 35 mm high with the face working surface and a shoulder for clamp fastening. The design of the apparatus permits use of reference specimens with a maximum working surface of up to 140 mm for which purpose there is a number of holes.

Most essential requirements to reference specimens are the parallelism of the working surface to the foundation and sufficiently large geometrical sizes, specifically, the height of the specimen, that ensure a required mass. The distance from the center of the imprint to the edge of the reference specimen and the distance between the centers of the neighbouring imprints should meet the requirements of the Brinell hardness test.

When carrying out the tests, the polished working surface 10 is normally used for this purpose. When the purpose is to examine the effect of the surface roughness on the properties of materials being studied, essentially, frictional ones, other grades of working surfaces can be utilized. For determining the mechanical properties of materials, it is necessary to measure the diameter of an imprint and its depth by recording profilograms on the profilometer-profilograph. The finer the surface, the higher the accuracy in measurements.

Arranged on the column 28, are an upper bracket 32 with a plate 33 secured to it to carry brackets 34 and 35 supporting the accessories for accelerating and dropping the ball, and a medium bracket 36 with a device for measuring the height of the ball rebounding and a lower bracket 37 with a device for measuring the length of the ball rebounding. All three brackets can be moved up and down column 28 carrying a scale.

The accessory for accelerating and dropping the ball is made up of a D.C. motor 38, suspended on two plane-parallel springs 39, secured on the bracket 35, a solenoid 40 and a fixed stop 41 provided on the bracket 34.

The ball being studied is held between the output shaft of the motor and the fixed stop 41 on whose end there is a fluoroplastic tip 42 with a flat butt. The butt end of the motor shaft has an accurately made tapered recess. The motor proper is well balanced.

The force of clamping the ball against the fixed stop is selected on condition of the absence of the ball's slipping on the shaft when they are accelerated and is made possible through an appropriate sagging of the springs 39 as a result of the ball mounting. The sagging of the springs is controlled by moving the fixed stop 41 inside the setting hole of the bracket 34 and its subsequent fastening by means of a bolt 43.

By appropriate fastening of the brackets 34 and 35, and by varying the position of the fixed stop 41, adjustment is made to balls of various diameters (from 5 to 16 mm) alongside with the setting of the axis of incidence of the ball. The coaxial setting of the ball holder and the fixed stop helps preclude premature falling out of the ball during acceleration.

The motor imparts to the ball required r.p.m. within the limits of up to 15,000. The r.p.m. are measured by tachometer. For calibration of the latter a stroboscope should be used.

Fastened to the butt end of the motor is a steel washer 44. Once the solenoid is cut in, the motor is attracted to it. accelerated ball is dropped with any change in the angular speed of the motor rotation. The provision of two plane-parallel springs ensures the displacement of the motor parallel to its original position and prevents transmission to the ball of a forced initial acceleration.

By moving the bracket 32 up and down the column 28, it is possible to set a required drop height which can be varied within 0 to 1,000 mm.

For measuring the length of the ball rebounding, use is made of a table fashioned as a plexiglass plate 45, on which is provided with the aid of springs 46, measuring paper 47 coated with carbon paper 48. The plate 45 is mounted on the bracket 37 whose displacement up and down the column 28 helps adjust the height of the table to comply with the level of the working surface of reference specimen 29. The locking of a bracket 37 is done by means of a wing nut 49.

Provided on plate 45 is a slide 50 designed to measure the lengths of ball reboundings by readings on plate 45.

As a result of the collision with the reference specimen 29, the ball drops on the table described hereinabove. After changing over the springs 46 from carbon paper to the measuring one and removing the carbon paper, it is necessary to measure, by caliper, the length of rebounding as a distance between the two imprints, one of which is on the specimen and the other on the measuring paper. When changing one material for another the length of rebounding may vary substantially.

By moving plate 45 along bracket 47, it is possible to vary the distance from the table to the reference specimen in horizontal plane.

To measure the height of rebounding, a device is used consisting, essentially, of a bracket 51 bearing a plate 52 with measuring and carbon paper, which is similar to that used for measuring the length of rebounding. With the aid of a guide 53, the plate 52, is secured by a nut 54, at a distance equal to half the length of the ball rebounding plus the radius of the ball. Upon the ball's striking against the reference specimen a subsequent rebounding, the ball makes an imprint on the measuring paper, this imprint permits the measurement the height of rebounding with the help of surface gauge.

The bracket 36 can also travel up and down the column 28, when changing the height of dropping for the ball.

Measuring the rebounding length and the rebounding height takes two tests in succession.

Supporting screws 55 serve to bear the apparatus as a whole. Alignment of the apparatus is done with respect to the upper surface of the foundation.

Let us view an example of utilizing the proposed device for studying the interaction of wheels with rolling surfaces. It is necessary to correlate the coefficients of sliding friction of a pneumatic wheel on road surfaces A and B with the view of assessing the effect of adherence, all other things being equal, which might condition the choice of the type of road surface for large-scale road-building. Now suppose that neither of the two had been produced earlier by industry, and tests have to be carried out on specimens. For this purpose, it is sufficent to analyze the parameters of one collision. To this end, blocks should be prepared from the above surface materials, each one measuring 1×1×0.1 m for a car wheel and somewhat greater for a heavy-duty vehicle wheel. Tests are conducted at similar starting velocities of sliding of the wheel and an invariable height of its dropping. The sizes of the blocks should be such as to provide a mass large enough for them to remain static during collision. When using underformable surfaces the height of the wheel rebounding will be practically the same. So what is left is to compare the lengths of reboundings without even measuring them because the place of collision of the wheel with the surface will be clearly seen on the latter owing to the slippage of the wheel. To this end it is sufficient to change the specimens of the surface. That surface from which the wheel rebounds to a greater distance possesses a greater coefficient of adherence with the given wheel. To avoid incidental errors, the test is repeated several times.

Considered hereinbelow is an example of utilizing a pulse tribometer for demonstrating the effect of friction at educational establishments.

The apparatus can be shown at school for illustrating friction at lessons of physics. The description of the given example of utilization of the apparatus presupposes certain conditionalities fraught with specific aspects of the task, e.g., in interpreting the impact as one devoid of friction, which is not exact because friction is inherent in any impact, including the direct impact of the ball lacking rotation. Yet, negligible forces of friction developing when the ball embeds into the surface of the reference specimen are counterbalanced.

The demonstration of the effect of friction is based on the comparison of the impact by the ball or some other body of rotation against some static object, with friction or without it. Most vivid friction effect can be displayed by direct impact.

Test 1. Impact Without Friction

The non-rotating ball is dropped freely onto the horizontal surface of the reference specimen. From the surface, the ball is rebounding along the normal.

Test 2. Impact With Friction

The ball is dropped freely along the vertical. The ball has a certain angular speed about the horizontal axis, and on the horizontal surface of the reference specimen. From the surface, the ball is rebounding at an angle to the horizontal due to the forces of friction. Should a layer of lubricant or water be applied to the surface being studied, the length of rebounding reduces markedly attesting to a smaller coefficient of friction.

The materials of the friction pair should be selected on condition of obtaining high coefficients of friction at resilient collision.

To this end, it is expedient to drop a steel ball on a sheet rubber.

We claim:

1. A method of studying frictional and mechanical properties of materials comprising the steps of striking the surface of a test specimen being studied against the surface of a reference specimen at a predetermined relative tangential speed corresponding to a predetermined type of friction; measuring the parameters of collision which are essential for determining the frictional and mechanical properties of the materials; allowing said test specimen and said reference specimen to carry out a number of successive rebounds; and measuring the parameters of rebound collisions to determine the coefficients of adherence, sliding friction and rolling friction as a function of the relative speed between said test specimen and said reference specimen.

2. A method as claimed in claim 1, wherein the parameters of one collision are measured.

3. A method as claimed in claim 1, wherein the parameters of collision are measured from the parameters of the rebound trajectory of at least one of said specimens.

4. A method as claimed in claim 3, wherein the parameters of the rebound trajectory are distances between two successive collisions and the maximum heights of the corresponding rebounds.

5. A method as claimed in claim 3, wherein the parameters of the rebound trajectory are distances between two successive collisions and the fall time of at least one of said specimens between the said two collisions.

6. A method as claimed in claim 1, wherein hysteresis losses during a predetermined type of friction at a predetermined speed are determined for a resilent impact from the rebounding parameters.

7. A method as claimed in claim 6, wherein the maximum heights of rebounding are used for determining hysteresis losses during a predetermined type of friction at a predetermined speed.

8. A method as claimed in claim 1, wherein said test specimen is a ball rebounding from a reference specimen on colliding therewith.

9. A method as claimed in claim 8, wherein the dynamic modulus of elasticity is measured during a predetermined type of friction at a predetermined speed from the area of an imprint and the maximum height of a subsequent rebounding of the ball when the ball deformation is resilient.

10. A method as claimed in claim 8, wherein the impact hardness of the reference specimen material during a predetermined type of friction at a predetermined speed is measured from the amount of energy spent on the plastic deformation of said reference specimen when the ball deformation if resilient.

11. A method as claimed in claim 1, wherein said test specimen is a pneumatic tire.

12. A method according to claim 1, wherein a relative tangential speed of the test specimen and reference specimen is developed by rotating the reference specimen about a substantially horizontal axis.

13. A device for studying frictional and mechanical properties of materials comprising: means for holding a test specimen and allowing it to strike with a surface under study against a surface under study of a reference specimen so that at least one of said specimens rebounds; a mechanism for applying a relative tangential speed to provide for a predetermined type of friction at a predetermined speed at the moment of collision, said mechanism having means to rotate said test specimen during testing about a substantially horizontal axis; and means for measuring the parameters of said rebounds.

* * * * *